March 30, 1954 — W. M. SARGENT — 2,673,441
LAWN MOWER
Filed Oct. 8, 1953 — 2 Sheets-Sheet 1
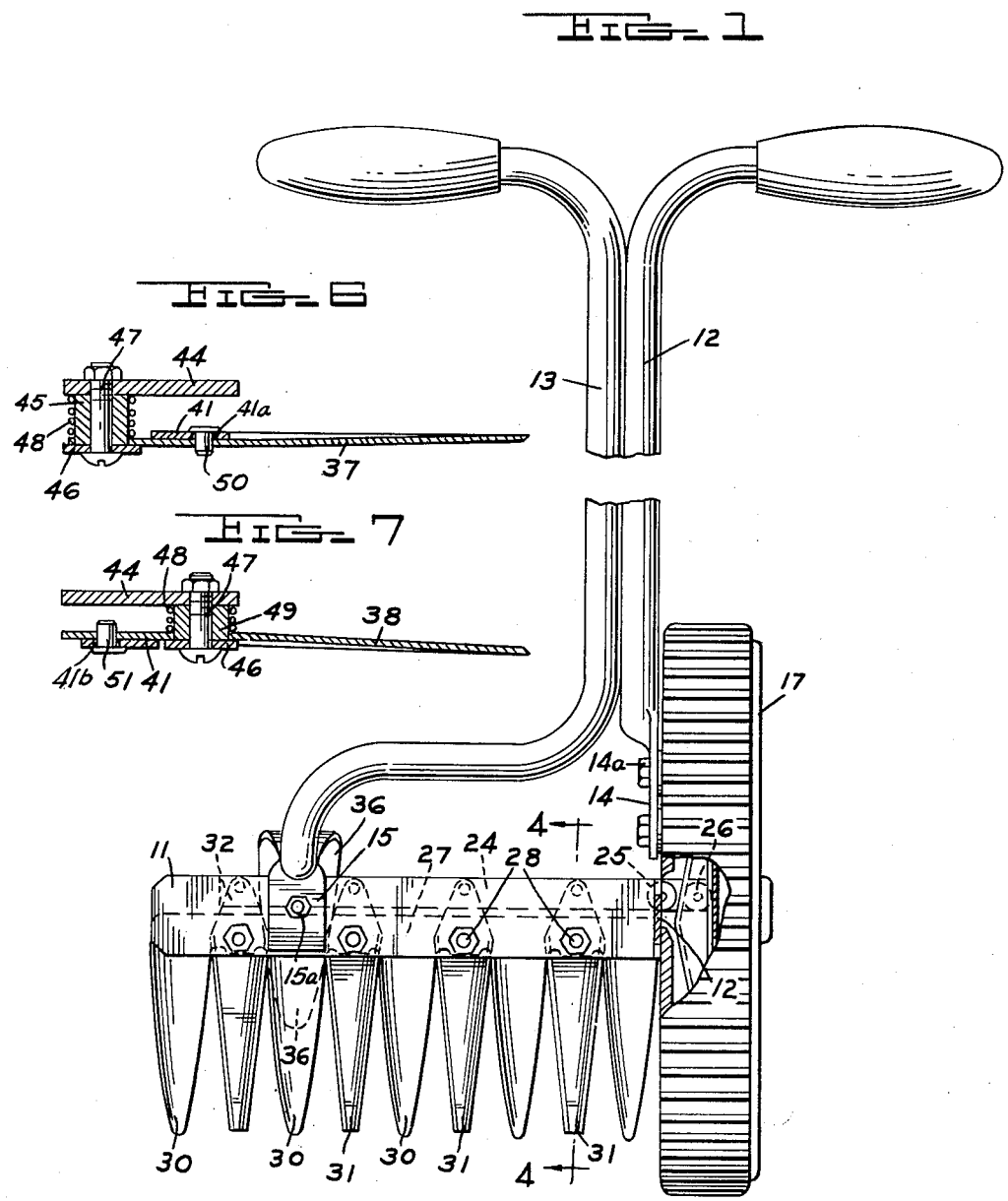
INVENTOR.
WARREN M. SARGENT
BY
ATTORNEYS

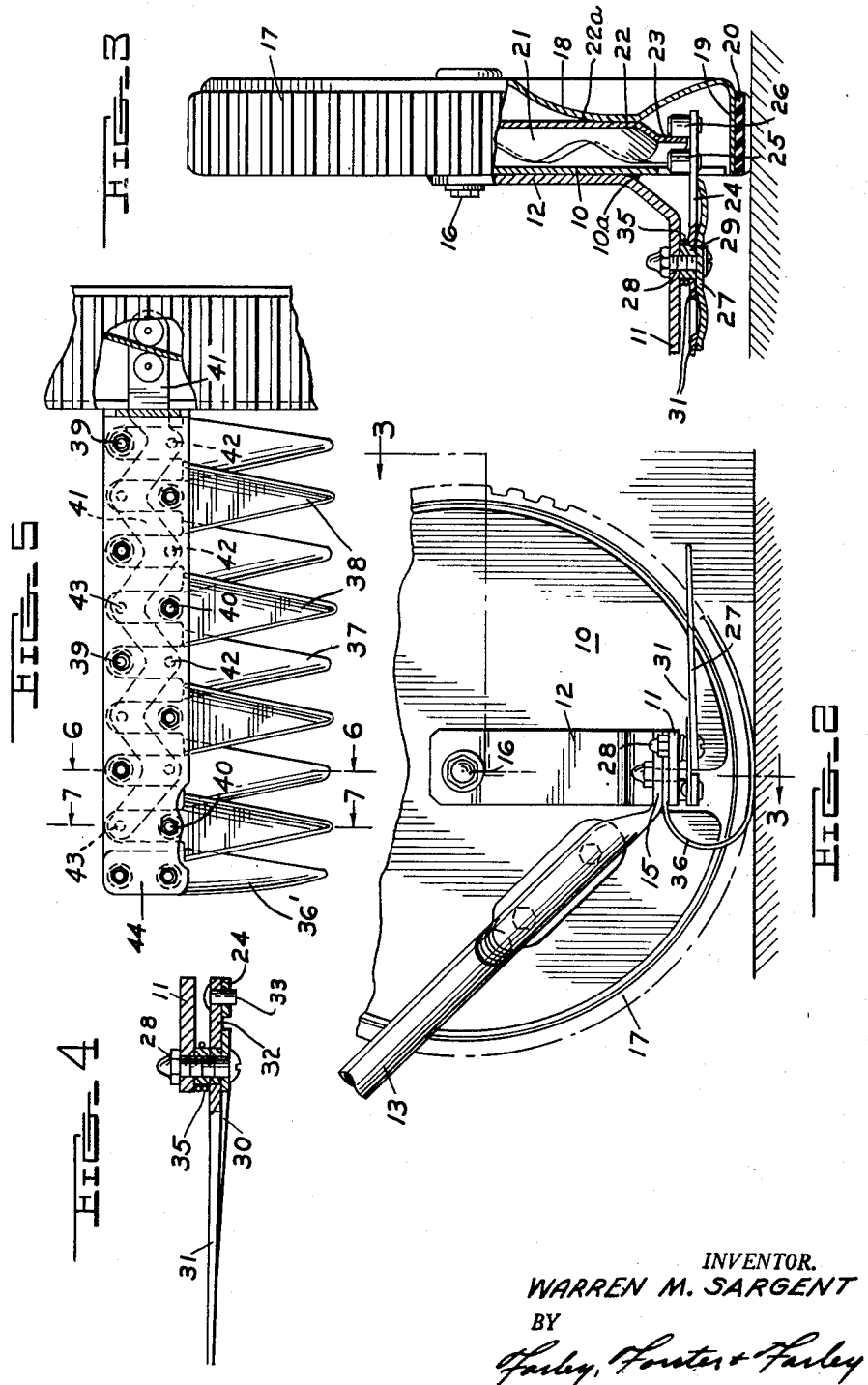

Patented Mar. 30, 1954

2,673,441

UNITED STATES PATENT OFFICE 2,673,441

LAWN MOWER

Warren M. Sargent, Ferndale, Mich.

Application October 8, 1953, Serial No. 385,018

4 Claims. (Cl. 56—246)

This invention relates to lawn mowers and more particularly to a lawn mower employing a scissors type of shearing action. The present application is a continuation-in-part of my prior copending application Serial No. 78,561, filed on February 26, 1949, now abandoned.

Numerous lawn mowers and trimmers have been developed employing a reciprocating cutting blade which, in cooperation with a stationary cutting blade, provides a plurality of shearing edges. It is conventional practice in such mowers to provide the reciprocating blade with a plurality of V shaped teeth, the sharpened edges of which form a plurality of shearing blades. The stationary cutting blade is conventionally provided with a like number of forwardly projecting fingers, provided with horizontal slots for guiding the reciprocating blade across the shearing edges of such fingers.

While such slots operate to prevent a large displacement between the reciprocating and stationary cutting edges, such as would impair cutting action efficiency with respect to relatively coarse grass, it has been found very difficult to obtain a shearing action in this manner which is sufficient to cut grass of the fine texture of the average lawn, since it is not feasible with a flat continuous blade to establish and maintain a sufficient engagement of cutting edges to provide positive shearing action with the result that grass tends to enter between the cutting surfaces and to spread them apart with the resultant clogging and loss of cutting efficiency. Theoretically, with true flat surfaces, a plurality of cutting edges could all be maintained in simultaneous shearing engagement. However, the impracticability of manufacturing and maintaining true flat surfaces has rendered this form of cutting action unadaptable to fine texture lawns.

One object of the present invention is to provide a lawn mower or trimmer adapted to incorporate any desired number of cutting blades wherein the shearing edges of each cooperating pair of individual blades may be maintained in continuous shearing engagement independent of the other blades.

Another object is to provide a plurality of individually pivoted blades wherein shearing edges are independently maintained in engagement although simultaneously actuated from a single drive mechanism.

Another object is to provide a lawn cutting mechanism wherein a single stationary blade is provided with a plurality of forwardly projecting cutting edges, and wherein a plurality of independently pivoted cooperating cutting blades are adapted to maintain independent shearing contact while being driven by a common drive member.

Another object is to provide an alternative cutting mechanism wherein two sets of independently pivoted cutting blades are adapted to be reciprocally driven by a common member in opposite directions.

Another object is to provide a unique means of maintaining shearing engagement between cooperating blades through springs mounted coaxially with the individual pivot points.

These and other objects will appear more clearly in the following detailed description of two embodiments of my invention, and from an examination of the drawings forming a part hereof wherein:

Fig. 1 is a plan view of a single-wheel lawn trimmer;

Fig. 2 is a side elevation of such trimmer;

Fig. 3 is a fragmentary sectional view taken along the line 3—3 of Fig. 2;

Fig. 4 is an enlarged sectional view of one of the blades taken along the line 4—4 of Fig. 1;

Fig. 5 is a fragmentary plan view of a modified construction employing two sets of oscillating blades;

Fig. 6 is an enlarged sectional view of a single pair of blades taken along the line 6—6 of Fig. 5; and Fig. 7 is an enlarged sectional view of a single pair of blades taken along the line 7—7 of Fig. 5.

Referring to the first embodiment shown in Figs. 1, 2, 3 and 4, the rigid frame comprises a circular plate 10; a horizontal bar 11, formed with a right angle, the vertical portion 12 thereof being welded at 10a to the plate 10; and tubular handle members 12 and 13 being attached by bolts 14a and 15a respectively with flattened ends 14 and 15 to the circular plate 10 and the horizontal bar 11.

A stub shaft is mounted by suitable means generally indicated at 16 to the plate 10, and bar 12, and forms the axle for drive wheel 17. A wheel stamping 18 is rotatably journaled by suitable bearings on the stub shaft and is provided at its outer diameter with a flange 19 forming the wheel rim on which a rubber tread 20 is secured by suitable means. A second annular stamping 21 is formed at its inside diameter with a plain ring section 22 which is welded at 22a to the wheel stamping 18, while the outer diameter is formed with an undulating cam track 23 adapted to impart oscillating motion to a horizontal bar 24, through a pair of rollers 25, 26 adapted to bear against either side of the track 23. A stationary shear plate 27 is connected to the horizontal bar 11 by a plurality of bolts 28, spacer bushings 29 being interposed therebetween. As is best shown in Figs. 1 and 3, the shear plate 27 is provided with a plurality of forwardly projecting blade members 30 which are somewhat concavely formed in cross-section to present edges above the level of other portions of the blade.

A plurality of independent cutter blades 31 are interposed between the horizontal bar 11 and the shear plate 27, such cutter blades being adapted to pivot about the bushings 29. Such blades are convexly formed in cross-section to present edges projecting beneath the level of other portions of the blade in order to assure contact with the upwardly extending edges of the stationary blades 30 of the shear plate 27. A rearward extension 32 on each of the movable cutter blades 31 is pivotally connected by a pin 33 to the drive bar 24. The blades 30 and 31 are not only curved in cross-section to assure contacting edges, but are also slightly curved in a longitudinal direction relative to each other in a manner causing their points to overlap in a horizontal plane as best shown in Fig. 4.

From the above description it will be seen that rotation of the drive wheel 17 through the undulating cam track 23 imparts oscillating motion to the drive bar 24, which will, in turn, cause each of the pivoted cutting blades 31 to articulate in shearing relation with the stationary blades 30. The independent mounting of each of the pivoted cutting blades 31, together with the curved cross- and longitudinal-sections of the blades 30 and 31, positively assures continuous contact of the shearing edges of each of the cutting blades at all times. Coil springs 35 are interposed between the horizontal bar 11 and the pivoted cutting blades 31 in order to maintain a contact pressure between the cutting edges of the respective blades throughout their travel to a predetermined maximum value.

A curved skid 36 is mounted on the horizontal bar 11 beneath the handle end 15 serving to maintain the outer end of the trimmer at a proper horizontal level.

In Figs. 5, 6 and 7, a modified construction is shown in which all of the cutter blades, except the outermost blade 36, are adapted to oscillate, alternate blades such as 37 and 38 moving in opposite directions. Such movement is effected by employing rearward and forward pivots 39 and 40, respectively, while the drive bar 41 is formed to permit forward and rear drive connections 42, 43, respectively. Sufficient clearance (41a, Fig. 6, 41b, Fig. 7) should be provided in the drive connections to avoid any binding effect incident to the relatively slight, oppositely directed longitudinal component of movement of the drive connecting points of adjacent cutter blades.

As shown in Fig. 6, rearwardly pivoted cutters are held in position relative to the horizontal bar 44 by a bushing 45, washer 46, bolt 47 and spring 48; while as shown in Fig. 7, the cutters pivoted to the forward edge of the bar 44 are similarly positioned except for the use of a somewhat shorter bushing 49. The drive bar 41 passes on the upper surface of the rearwardly pivoted cutters and the lower surface of the forwardly pivoted cutters, being drivingly connected thereto by suitable pins 50 and 51.

It will be seen that with this arrangement a given throw of the cam track will produce twice the effective movement of the cutter blades as in the first case where one set of stationary blades are employed. Furthermore, cutter blades which are identical except for the size of their respective forward and rear pivot holes may be employed, such blades being replaceable in the event of damage.

It will be observed that with each of these constructions provision is made for assuring positive contact of the shearing edges of each of the cutter blades at all times, while any desired number of shearing edges and width of cut may be readily incorporated through the use of a plurality of independent cutter blades, individually pivoted, and all actuated by a common drive bar.

While two embodiments of my invention have been described in detail, it will be realized that numerous modifications might be incorporated without departing from the scope of my invention as defined by the following claims.

I claim:

1. A lawn mower comprising a frame, a drive wheel rotatably journaled in said frame, a reciprocable drive bar for said wheel, a plurality of cutter blades individually pivotally connected to said frame and drivingly connected to said drive bar, the pivotal connections of every other cutter blade being in substantial alignment and the driving connections of every other blade also being in substantial alignment, the pivotal and driving connections of adjacent blades being substantially reversed in position, and said drive bar being formed to simultaneously move all cutter blades, adjacent blades moving in opposite directions.

2. A lawn mower as set forth in claim 1 wherein the shearing edges of adjacent blades are curved relative to each other in a manner adapted to produce shearing contact at the point of shearing action only throughout the stroke of the blades.

3. A lawn mower as set forth in claim 1 wherein adjacent blades are curved relative to each other in a manner adapted to produce contact between the edges of adjacent blades at the point of shearing only throughout the shearing stroke, and wherein a spring associated with the pivotal connection of at least one of each cooperating pair of shearing blades is adapted to limit the contact pressure of said shearing edges.

4. A lawn mower as set forth in claim 1 wherein opposite edges of each cutting blade are adapted to produce shearing action during alternate portions of the reciprocating cycle.

WARREN M. SARGENT.

References Cited in the file of this patent

UNITED STATES PATENTS

| Number | Name | Date |
|---|---|---|
| 14,777 | Roney | Apr. 29, 1856 |
| 15,672 | Stoddard | Sept. 2, 1856 |
| 2,422,942 | Wood | June 24, 1947 |